US012703555B2

(12) United States Patent
McGoff

(10) Patent No.: US 12,703,555 B2
(45) Date of Patent: Aug. 11, 2026

(54) VOID FILL PACKAGING PRODUCT AND METHODS FOR MAKING

(71) Applicant: TEMPERPACK TECHNOLOGIES INC., Richmond, VA (US)

(72) Inventor: James McGoff, Richmond, VA (US)

(73) Assignee: TemperPack Technologies Inc., Richmond, VA (US)

( * ) Notice: Subject to any disclaimer, the term of this patent is extended or adjusted under 35 U.S.C. 154(b) by 49 days.

(21) Appl. No.: 18/719,568

(22) PCT Filed: Dec. 14, 2022

(86) PCT No.: PCT/US2022/052784
§ 371 (c)(1),
(2) Date: Jun. 13, 2024

(87) PCT Pub. No.: WO2023/114261
PCT Pub. Date: Jun. 22, 2023

(65) Prior Publication Data

US 2025/0051077 A1 Feb. 13, 2025

Related U.S. Application Data

(60) Provisional application No. 63/314,772, filed on Feb. 28, 2022, provisional application No. 63/289,683, filed on Dec. 15, 2021.

(51) Int. Cl.
*B65D 81/05* (2006.01)
*B31D 5/00* (2017.01)

(52) U.S. Cl.
CPC ........... *B65D 81/05* (2013.01); *B31D 5/0069* (2013.01); *B31D 2205/0023* (2013.01);
(Continued)

(58) Field of Classification Search
CPC .. B65D 81/09; B65D 2581/053; B65D 81/05; B65D 81/107
(Continued)

(56) References Cited

U.S. PATENT DOCUMENTS 1,388,467 A 8/1921 Keller
2,076,945 A * 4/1937 Hoeflich .................. B31D 5/04
493/464

(Continued)

OTHER PUBLICATIONS

International Search Report and Written Opinion mailed Mar. 9, 2023, for International Patent Application No. PCT/US2022/052784, which was filed Dec. 14, 2022 (Applicant: Temperpack Technologies Inc. // Inventor: James McGoff) (9 pages).

*Primary Examiner* — Chun Hoi Cheung
(74) *Attorney, Agent, or Firm* — TROUTMAN PEPPER LOCKE LLP; Christopher J. Forstner; Scott A. Bergeson

(57) ABSTRACT

Briefly described, embodiments of the presently disclosed subject matter relate to void fill packaging products and one or more methods for making the void fill packaging products. The void fill packaging product is configured to cushion items for transport whether that be shipping long distances, local delivery, or self-transport in a vehicle. Specifically, in one aspect, a void fill product for packaging, may include a single spiraled continuous paper sheet surrounding a hollow center and forming at least two layers that overlap in a first direction. The portions of the at least two layers may overlap and may be mechanically joined in a second direction that is approximately perpendicular to the first direction.

19 Claims, 9 Drawing Sheets

(52) U.S. Cl.
CPC ................ *B31D 2205/0047* (2013.01); *B31D 2205/0064* (2013.01); *B65D 2581/053* (2013.01)

(58) Field of Classification Search
USPC .................................. 206/591, 584; 497/407
See application file for complete search history.

(56) References Cited

U.S. PATENT DOCUMENTS

| | | | | | |
|---|---|---|---|---|---|
| 3,685,400 | A * | 8/1972 | Higa | A41G 1/04 | 493/407 |
| 3,704,730 | A | 12/1972 | Witzig | | |
| 3,859,897 | A * | 1/1975 | Higa | A41G 1/04 | 428/17 |
| 3,928,939 | A | 12/1975 | Edwards et al. | | |
| 4,247,289 | A * | 1/1981 | McCabe | B65D 5/505 | 206/521 |
| 4,968,291 | A * | 11/1990 | Baldacci | B31D 5/0047 | 493/464 |
| 5,181,614 | A * | 1/1993 | Watts | B31D 5/006 | 206/584 |
| 5,468,525 | A * | 11/1995 | Watts | B65D 81/09 | 428/371 |
| 5,525,176 | A * | 6/1996 | Higa | B31F 1/12 | 428/153 |
| 5,791,483 | A * | 8/1998 | Simmons | B31D 5/0047 | 493/464 |
| 6,183,586 | B1 * | 2/2001 | Heidelberger | B65D 81/107 | 156/200 |
| 7,007,887 | B2 * | 3/2006 | van de Camp | B32B 37/12 | 40/660 |
| 7,972,258 | B2 * | 7/2011 | Slovencik | B65D 81/09 | 53/445 |
| 8,114,490 | B2 * | 2/2012 | Slovencik | B31D 5/0052 | 428/34.3 |
| 8,491,453 | B2 * | 7/2013 | Slovencik | B65D 81/09 | 493/464 |
| 8,695,801 | B2 * | 4/2014 | Jensen | B65H 75/08 | 206/394 |
| 2004/0052988 | A1 * | 3/2004 | Slovencik | B65D 81/09 | 428/36.9 |
| 2004/0108243 | A1 | 6/2004 | Jeannin | | |
| 2005/0287317 | A1 * | 12/2005 | Gershin | B65B 55/20 | 53/472 |

* cited by examiner

VOID FILL PACKAGING PRODUCT AND METHODS FOR MAKING

CROSS-REFERENCE TO RELATED PATENT APPLICATIONS

This application is a National Stage Entry of PCT Application No. PCT/US22/52784, filed Dec. 14, 2022, which claims priority under Article 8 of the PCT to, U.S. Provisional Patent Application No. 63/289,683 filed Dec. 15, 2021, and U.S. Provisional Patent Application No. 63/314,772, filed on Feb. 28, 2022, the entireties of each of which are incorporated herein as if fully set forth below.

FIELD

The presently disclosed subject matter generally relates to void fill packaging products and methods for the making the void fill packaging product.

BACKGROUND

Shipping consumer goods has increased as consumer shop more and more online. Consumers appear to appreciate the convenience of shopping at your fingertips on their mobile devices and ordering items shipped to your front door. This permanent trend for the foreseeable future requires a significant increasing demand for packing materials. One such packing material is void fill packaging that cushions items shipped in boxes or other shipping containers. Void fill packaging typically includes air-filled plastic (e.g., small, or large bubble wrap). However, this air-filled plastic tends to not be curbside recyclable because typical recycling operations do not accept the loose plastic in their sort machines because of the difficulty of separating flexible films from rigid materials such as plastic bottles, aluminum cans, and corrugated paperboard. Thus, this plastic film tends to contribute landfill waste that does not breakdown. This air-filled plastic and other similar does not have sufficient "give" to allow for cushioning an item for shipping. Put another way, the air-filled plastic are hermetically sealed, which does not allow air to escape, resulting in them lacking compression characteristics that allow for cushioning. Instead, they tend to act rigid when under pressure.

Accordingly, there is a need for recyclable and cushioning void-fill material for packaging that is lightweight, recyclable, and effective and methods for making. Embodiments of the present disclosure are directed to this and other considerations.

SUMMARY

Briefly described, embodiments of the presently disclosed subject matter relate to void fill packaging products and one or more methods for making the void fill packaging products. The void fill packaging product is configured to cushion items for transport whether that be shipping long distances, local delivery, or self-transport in a vehicle. Specifically, in one aspect, a void fill product for packaging, may include a single spiraled continuous paper sheet surrounding a hollow center and forming at least two layers that overlap in a first direction. The portions of the at least two layers may overlap and may be mechanically joined in a second direction that is approximately perpendicular to the first direction.

In another aspect, a void fill product for packaging may include a single spiraled continuous sheet surrounding a hollow center and forming at least two layers that overlap in a first direction. Portions of the at least two layers may overlap and may be mechanically joined in a second direction.

In other aspects, a process for forming a void fill product may include wrapping a continuous sheet around a mold at least twice to form at least two layers overlapping in a first direction with a hollow center filled by the mold, cutting an unwrapped portion of the continuous sheet of paper to separate the unwrapped portion from the at least two layers, crumpling the at least two layers in a second direction that is approximately perpendicular to the first direction to mechanically interlock the at least two layers without stitching or an adhesive, and removing the at least two layers from the mold.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

DETAILED DESCRIPTION

Figure 1A:
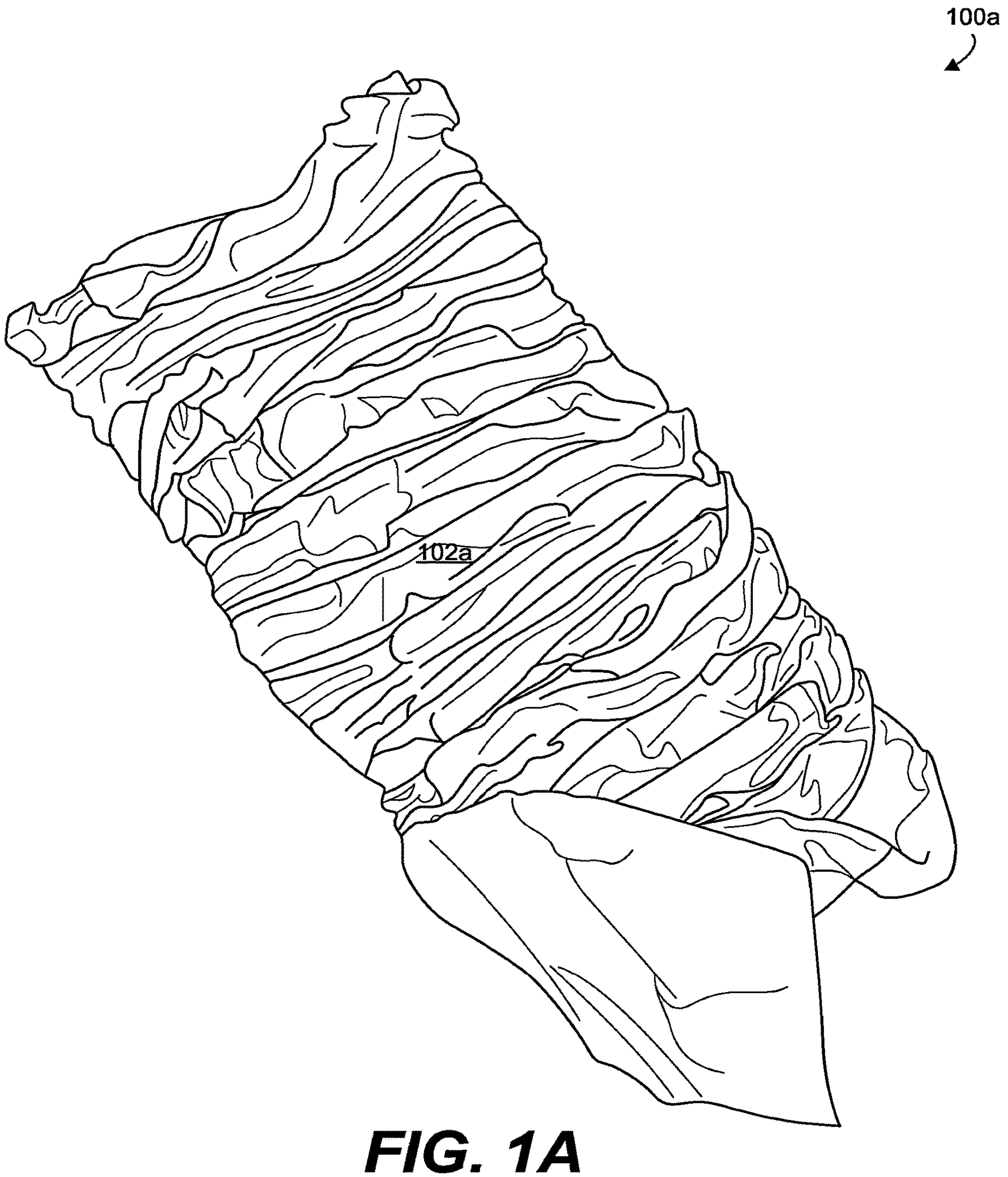
FIG. 1A is a perspective view of a side of a void fill packaging product with a circular cross-section according to an exemplary embodiment.

To facilitate an understanding of the principals and features of the disclosed technology, illustrative embodiments are explained below. The components described hereinafter as making up various elements of the disclosed technology are intended to be illustrative and not restrictive.

Embodiments of the disclosed technology include a void fill packaging product capable of being recycled curbside. In addition, the void fill packaging product is flexible and provides cushioning to items (e.g., groceries or fragile items) packed with the void fill packaging product. Other advantages include a hollow center configure to provide maximum volume displacement, crumpled layers to provide strength and mechanical interlock the layers surrounding hollow center, and the lack of using adhesives to adhere the layers to one another to make the void fill packaging more recyclable.

Referring now to the figures, in which like reference numerals represent like parts, various embodiments of the disclosure will be disclosed in detail.

Figure 1B:
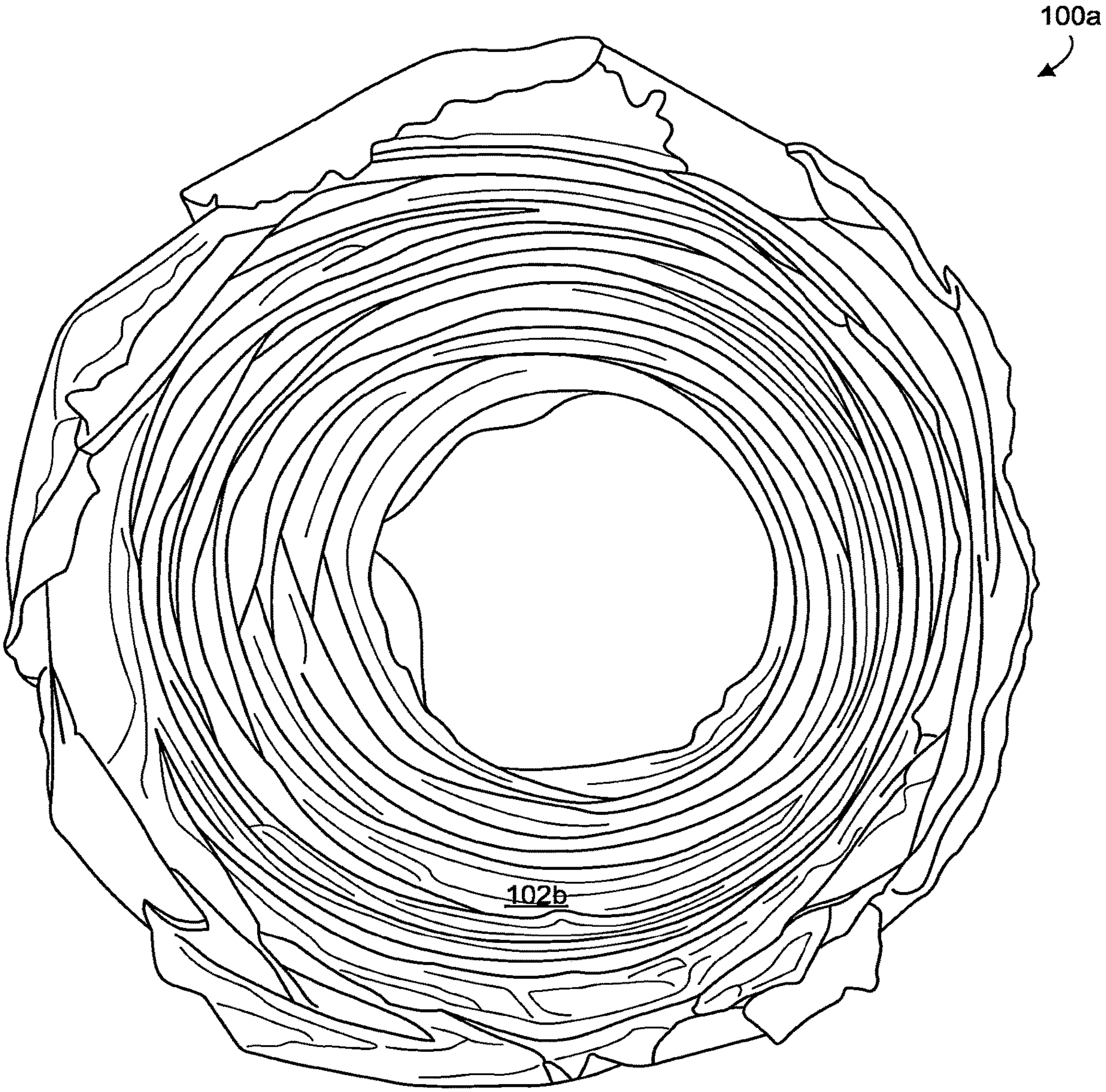
FIG. 1B is a perspective view of a front of the void fill packaging product of FIG. 1A.
Figure 1C:
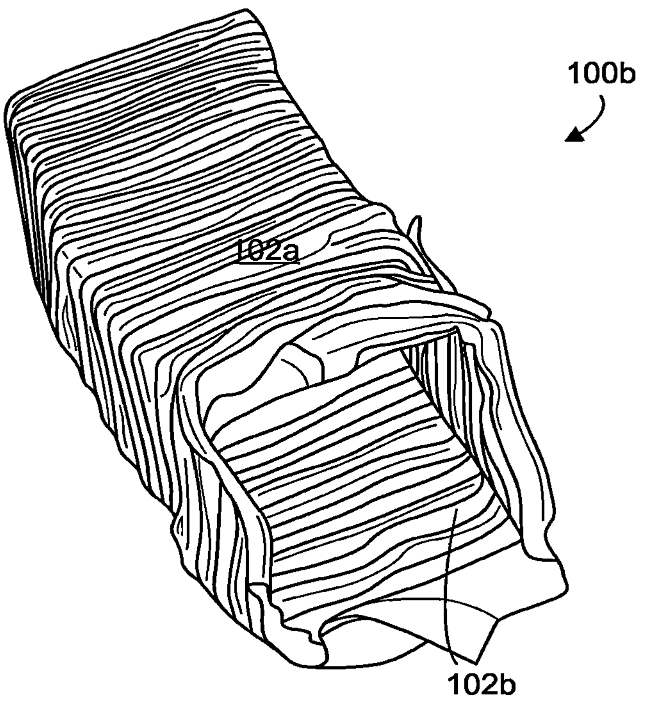
FIG. 1C is a perspective view of a void fill packaging product with a square cross-section according to an exemplary embodiment.
Figure 1D:
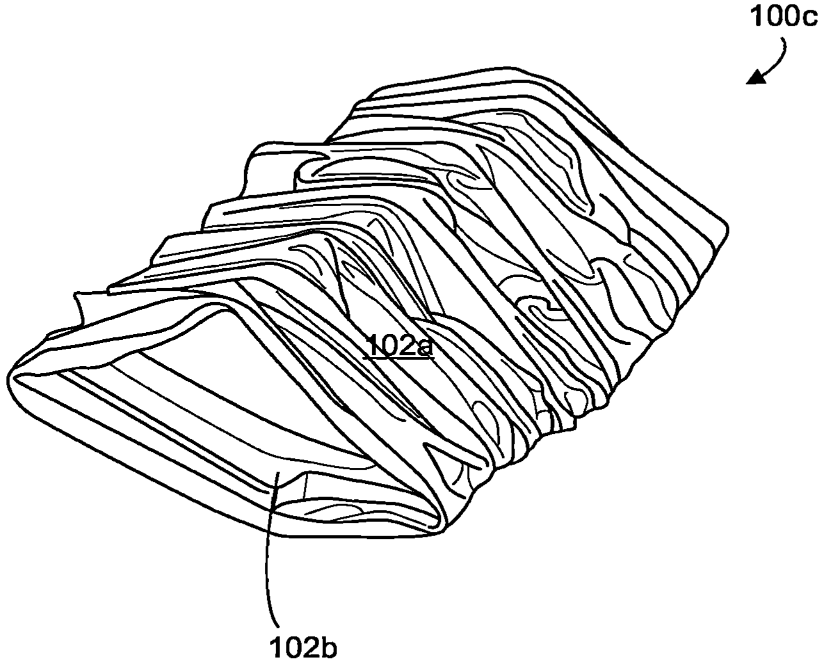
FIG. 1D is perspective view of a void fill packaging product with a triangular cross-section according to an exemplary embodiment.
Figure 1E:
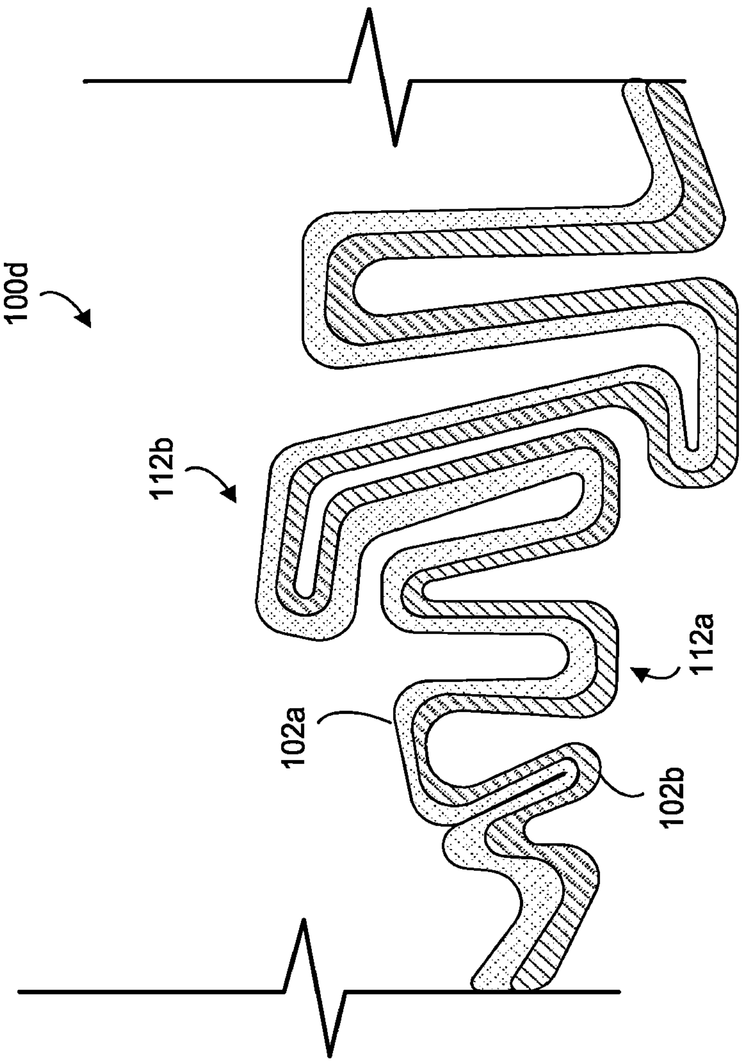
FIG. 1E is an enlarged cut-away side view of a portion of FIG. 1D.

FIG. 1A and FIG. 1B illustrate an exemplary void fill packaging product 100*a* with at least two layers such as outer layer 102*a* and inner layer 102*b* that are formed from a single spiraled continuous paper sheet surrounding a hollow center. The void fill packaging product 100*a* may include one or more additional layers between the outer layer 102*a* and the inner layer 102*b*. Regardless, at least the outer layer 102*a* and the inner layer 102*b* may overlap in a first direction may be mechanically joined in a second direction that is approximately perpendicular to the first direction from crumping these layers together without the use of adhesives or stitching. However, in some embodiments, the outer layer 102*a*, inner layer 102*b*, and any additional layers are stitched together with paper or other materials. Although the void fill packaging product 100*a* may have a circular cross section as shown, FIG. 1C illustrates a void fill packaging product 100*b* with a square cross-section and FIG. 1E illustrates a void fill packaging product 100*c* with a triangular cross section. Void fill packaging products 100*a*, 100*b*, 100*c* are exemplary and any cross-section is possible such as circular, oval-shaped, square, rectangular, triangular, trapezoidal, hexagonal, or octagonal, etc. In some embodiments, the entire surface of the void fill packaging products 100*a*, 100*b*, 100*c* are crumpled and mechanically joined with overlapping layers making for a strong bond and overall product.

FIG. 1E illustrates an exemplary cut-away side view of a portion of void fill product 100*d*. As shown, the void fill product 100*d* may include two layers-outer layer 102*a* and inner layer 102*b* that are crumpled together. For example, the two layers overlap and include at least one folded portion 112*a* and at least one overlapping extension portion where the outer layer 102*a* overlaps itself and the inner layer 102*b* overlaps itself.

Figure 2A:
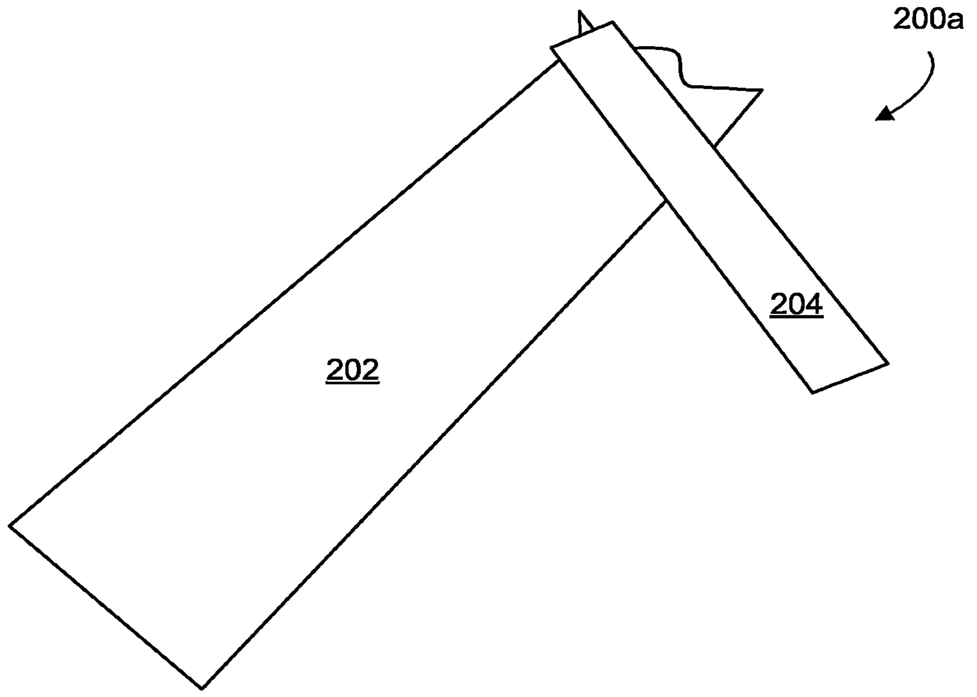
FIGS. 2A-2D illustrate a process for making the void fill packaging product of FIG. 1D according to an exemplary embodiment.
Figure 2B:
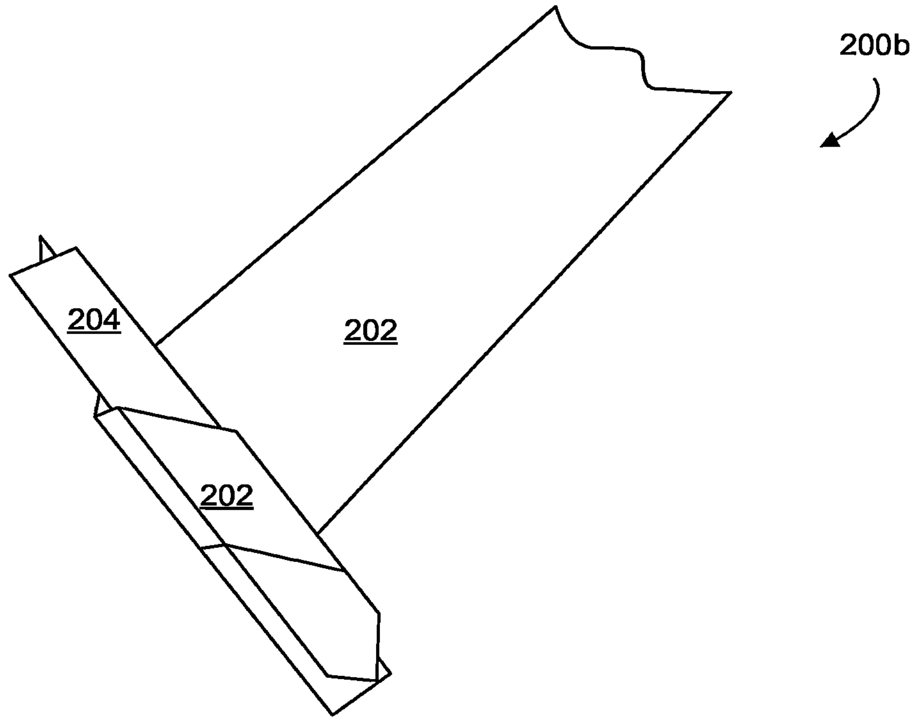
Figure 2C:
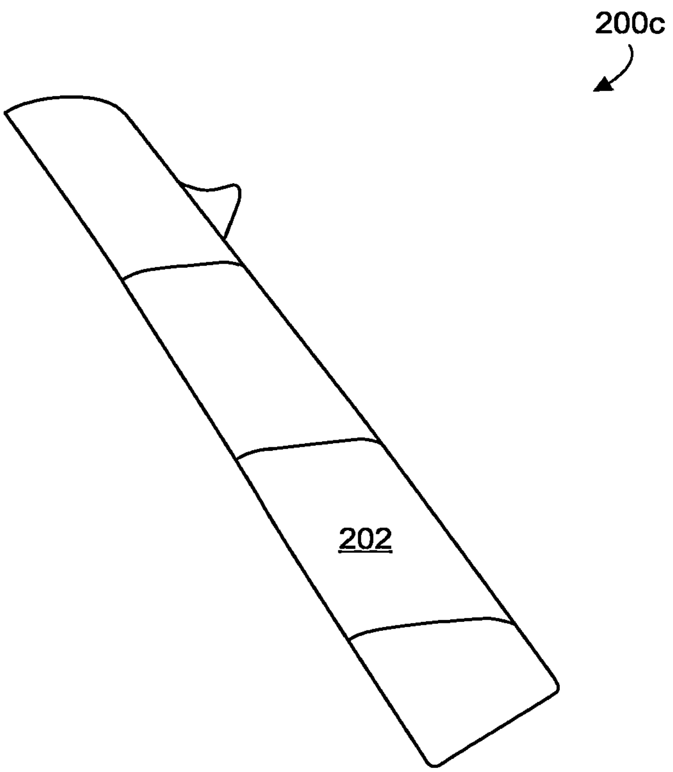
Figure 2D:
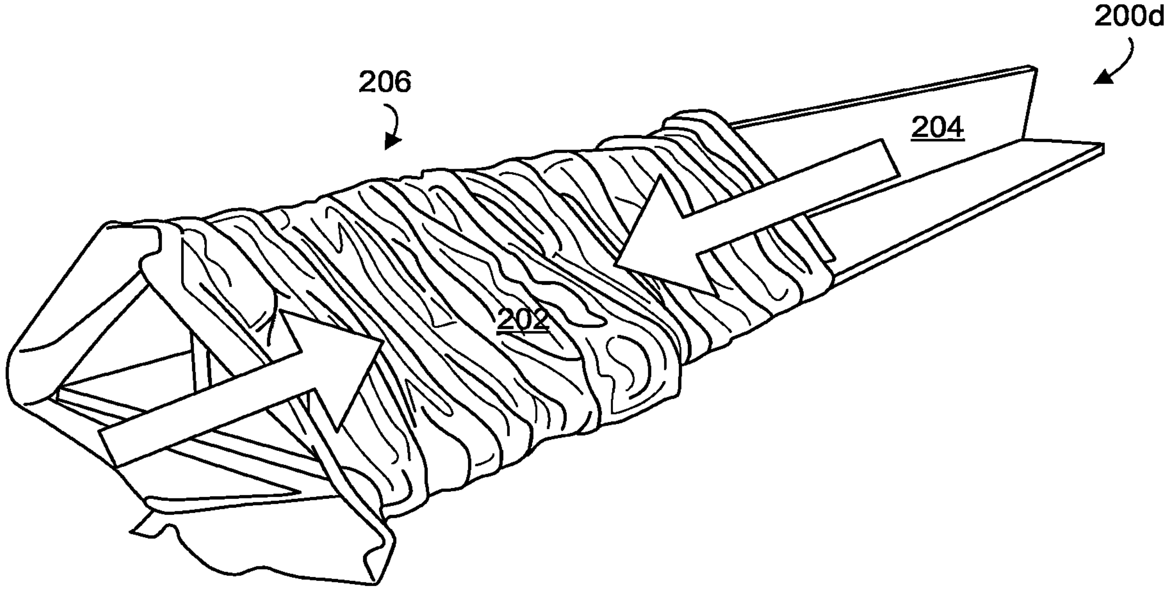
Figure 3A:
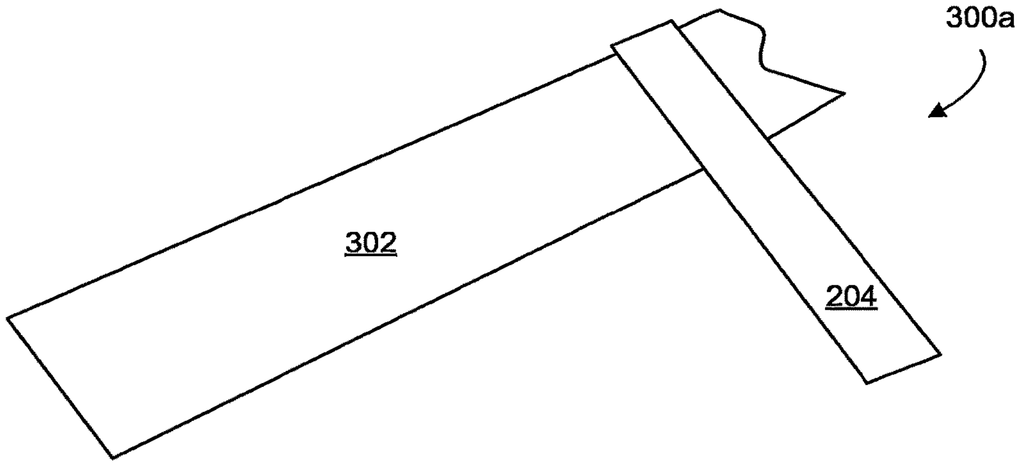
FIGS. 3A-3D illustrate a process for making the void fill packaging product of FIG. 1D according to an exemplary embodiment.
Figure 3B:
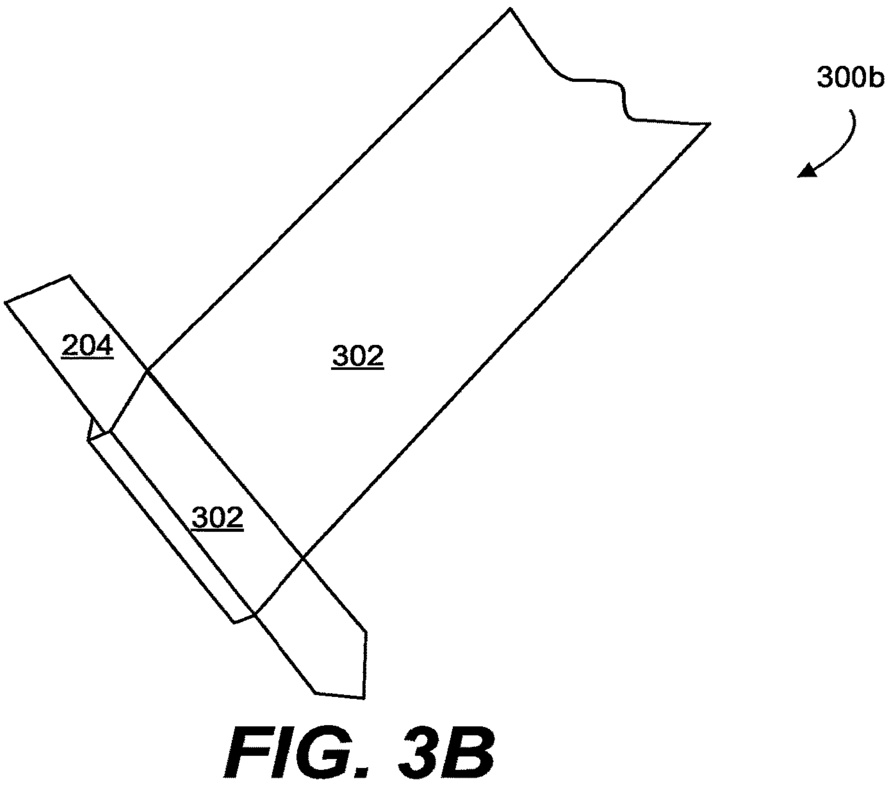
Figure 3C:
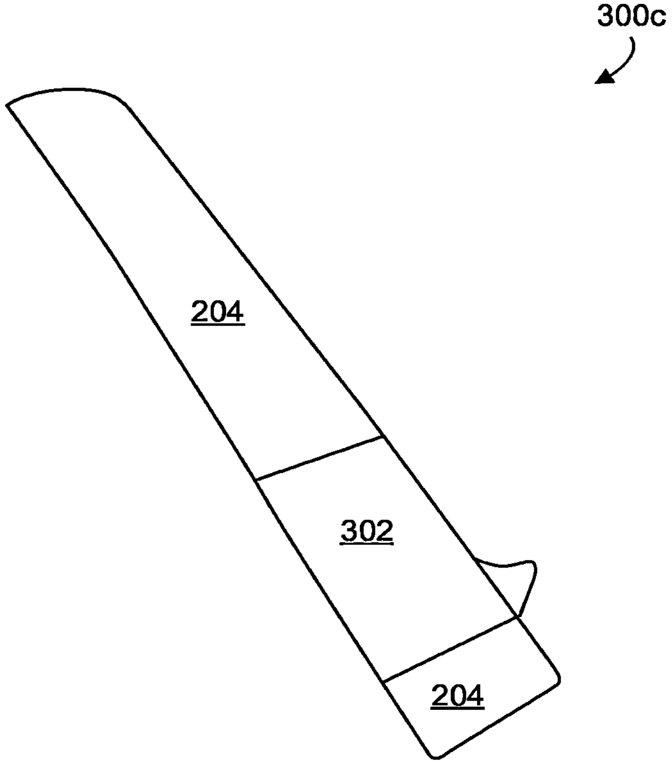
Figure 3D:
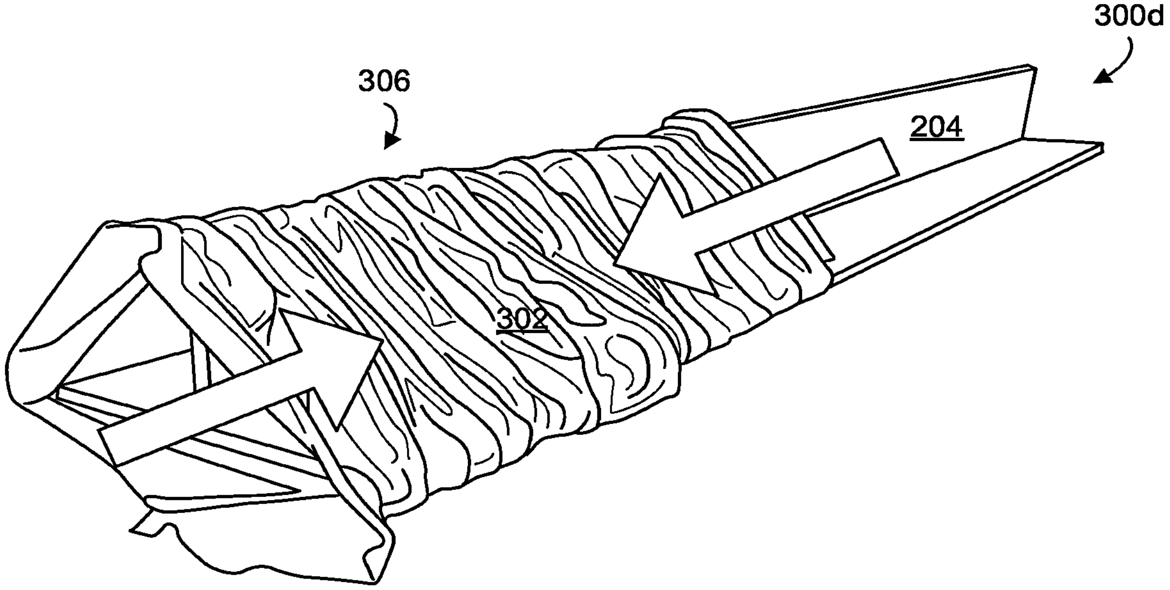

FIGS. 2A-2D illustrate an exemplary process for making a void filled product. In FIGS. 2A, 2B, and 2C a single continuous sheet 202 is wrapped around a mold 204 (e.g., a mold with a triangular cross-section) at least twice in a spiral fashion so that the single continuous sheet 202 overlaps in a first direction with a hollow center filled by the mold 204. In some embodiments, an unwrapped portion of the continuous sheet of paper 202 is cut from the at least two layers wrapped around the mold 204. In other embodiments, the continuous sheet of paper 202 is pre-cut prior to wrapping it around the mold 204 so that there is no unwrapped portion of the continuous sheet of paper 202. As shown, in FIG. 2D, the at least two layers wrapped around the mold 204 may be crumpled in one or two directions opposite one another to mechanically interlock the layers together without stitching or an adhesive to create void fill product 206 that is curbside recyclable. A machine using sets of rollers pushing the paper in opposite directions may cause the crumpling and mechanical interlocking and overlapping in opposing directions. Finally, the void fill product (at least two layers) is removed from the mold 204.

FIGS. 3A-3D illustrate an exemplary process for making a void filled product. In FIGS. 3A, 3B, 3C, and 3D are similar to FIGS. 2A, 2B, 2C, and 2D except that a single continuous sheet 302 is wrapped around a mold 204 (e.g., a mold with a triangular cross-section or a cylindrical shape) at least twice in a non-spiral fashion so that the single continuous sheet 302 overlaps in a first direction with a hollo center filled by the mold 204. For example, the single continuous sheet may wrap around mold such that the single continuous sheet 302 only wraps around itself creating a consistent product in batch operation. The unwrapped portion of the continuous sheet of paper 302 may be cut from the at least two layers wrapped around the mold 204. In other embodiments, the continuous sheet of paper 302 is pre-cut prior to wrapping it around the mold 204 so that there is no unwrapped portion of the continuous sheet of paper 302. As shown, in FIG. 3D, the at least two layers wrapped around the mold 204 may be crumpled in one or two directions opposite one another to mechanically interlock the layers together without stitching or an adhesive to create void fill product 206 that is curbside recyclable. A machine using sets of rollers pushing the paper in opposite directions may cause the crumpling and mechanical interlocking and overlapping in opposing directions. In some embodiments, rings (e.g., cylindrical, triangular, or other shaped) may be placed or previously placed on the mold 204 and may be forced toward one another to crumple and mechanically interlock the at least two layers. Finally, the void fill product (at least two layers) is removed from the mold 204.

Figure 4:
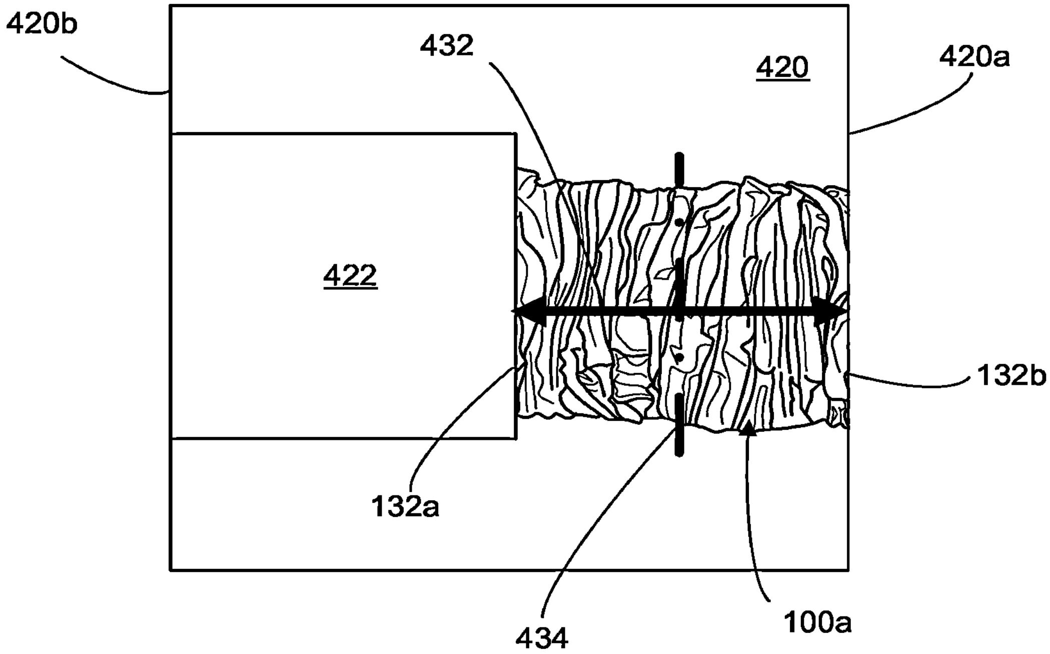
FIG. 4 illustrates an exemplary use and spring force properties of an exemplary void fill packaging product.

FIG. 4 illustrates an exemplary use of a void filled product 102*a* according to one or more embodiments. Void fill products 100*a*, 100*b*, 100*c* described herein (and other shaped not specifically described) have unique spring force properties imparted to them via the crumpling described above. The void fill products 100*a*, 100*b*, 100*c* tend to expand from the center to toward the ends of the void filled products. For example, void fill product 100*a* may be placed between an item 422 and a wall of a shipping container 420 such that the void fill product 102*a* compresses toward its center line 434, which is perpendicular to a line running from the first end 132*a* to the second send 132*b* of the void fill product 102*a* and located equal distance from both ends. Because the natural state of the void fill product 102*a* is an expanded state, it will hold item 422 in place in the box against an opposing wall 420*b* of shipping container 420. Put another way, void fill product 102*a* will attempt to expand in along force line 432 or in a longitudinal or axial direction starting from center line 434. In some embodiments, the void fill product 102*a* may be placed between two walls 420*a*, 420*b* imparting an axial force (e.g., spring-like force) between the two walls 420*a*, 420*b* with the item 422 below thereby preventing the item 422 from moving within the shipping container 420.

These spring-like qualities are unique to void fill products and this quality is important for the following reasons. Consumers order randomly, so void space in a shipping container is nearly impossible to predict or eliminate. However, shipping container such as boxes are rigid and have a fixed volume. Therefore, it is beneficial to have a void fill product that can fit tightly into small voids, as well as expand into larger voids within the shipping container. The spring design accomplishes this. Also, once in place, the spring imparts an outward axial force, which results pushes objects against one another, or against the walls of the corrugated.

In some examples, disclosed insulation products, machines, and methods may involve one or more of the following clauses:

Clause 1: A void fill product for packaging, comprising: a single spiraled continuous paper sheet surrounding a hollow center and forming at least two layers that overlap in a first direction, and wherein portions of the at least two layers overlap and are mechanically joined in a second direction that is approximately perpendicular to the first direction.

Clause 2: The void fill product of clause 1, wherein the portions of the at least two layers are mechanically joined without adhesive or stitching.

Clause 3: The void fill product of clause 2, wherein the at least two layers are crumpled in the second direction.

Clause 4: The void fill product of clause 1, wherein the at least two layers overlap and are mechanically joined in a third direction opposite of the second direction.

Clause 5: The void fill product of clause 4, wherein the at least two layers are crumpled in the third direction.

Clause 6: The void fill product of clause 1, comprising a triangular cross-section, a square cross-section, or a circular cross-section.

Clause 7: A void fill product for packaging, comprising: a single spiraled continuous sheet surrounding a hollow center and forming at least two layers that overlap in a first direction, and wherein portions of the at least two layers overlap and are mechanically joined in a second direction.

Clause 8: The void fill product of clause 7, wherein the portions of the at least two layers are mechanically joined without adhesive or stitching and the single spiraled continuous sheet comprises paper.

Clause 9: The void fill product of clause 7, wherein the at least two layers are crumpled in the second direction.

Clause 10: The void fill product of clause 7, wherein the at least two layers overlap and are mechanically joined in a third direction opposite of the second direction.

Clause 11: The void fill product of clause 10, wherein the at least two layers are crumpled in the third direction.

Clause 12: The void fill product of clause 1, comprising a triangular cross-section, a square cross-section, or a circular cross-section.

Clause 13: A process for forming a void fill product, comprising: wrapping a continuous sheet around a mold at least twice to form at least two layers overlapping in a first direction with a hollow center filled by the mold; cutting an unwrapped portion of the continuous sheet of paper to separate the unwrapped portion from the at least two layers; crumpling the at least two layers in a second direction that is approximately perpendicular to the first direction to mechanically interlock the at least two layers without stitching or an adhesive; and removing the at least two layers from the mold.

Clause 14: The process of clause 13, wherein mold comprises a triangular, square, or circular cross-section.

Clause 15: The process of clause 13, wherein the continuous sheet is a continuous sheet of paper.

Clause 16: The process of clause 15, further comprising unrolling the continuous sheet of paper from a roll of paper.

Clause 17: The process of clause 13, wherein crumpling the at least two layers in the second direction comprises use one or more first sets of rollers to force portions of the at least two layers in the second direction to overlap and interlock while wrapped around the mold.

Clause 18: The process of clause 17, further comprising crumpling the at least two layers in a third direction that is opposite the second direction.

Clause 19. The process of clause 18, wherein crumpling the at least two layers in the third direction comprises use one or more second sets of rollers to force portions of the at least two layers in the third direction to overlap and interlock while wrapped around the mold.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. This disclosure is intended to cover various modifications and equivalent arrangements included within the scope of the appended claims. Although specific terms are employed herein, they are used in a generic and descriptive sense only and not for purposes of limitation.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, "recyclable" may refer to any product that is eligible for either curbside collection or for being accepted into recycling programs that use drop-off locations.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A void fill product for packaging, comprising:

a single spiraled continuous paper sheet surrounding a hollow center and forming at least two layers that overlap in a first direction, wherein portions of the at least two layers overlap and are mechanically joined in a second direction that is approximately perpendicular to the first direction, and wherein at least a first layer of the at least two layers surrounds the hollow center at an angle in relation to a longitudinal axis of the void fill product.

2. The void fill product of claim 1, wherein the portions of the at least two layers are mechanically joined without adhesive or stitching.

3. The void fill product of claim 2, wherein the at least two layers are crumpled in the second direction.

4. The void fill product of claim 1, wherein the at least two layers overlap and are mechanically joined in a third direction opposite of the second direction.

5. The void fill product of claim 4, wherein the at least two layers are crumpled in the third direction.

6. The void fill product of claim 1, comprising a triangular cross-section, a square cross-section, or a circular cross-section.

7. A void fill product for packaging, comprising:

a single spiraled continuous sheet surrounding a hollow center and forming at least two layers that overlap in a first direction, wherein portions of the at least two layers overlap and are mechanically joined in a second direction, and wherein at least a first layer of the at least two layers surrounds the hollow center at an angle in relation to a longitudinal axis of the void fill product.

8. The void fill product of claim 7, wherein the portions of the at least two layers are mechanically joined without adhesive or stitching and the single spiraled continuous sheet comprises paper.

9. The void fill product of claim 7, wherein the at least two layers are crumpled in the second direction.

10. The void fill product of claim 7, wherein the at least two layers overlap and are mechanically joined in a third direction opposite of the second direction.

11. The void fill product of claim 10, wherein the at least two layers are crumpled in the third direction.

12. The void fill product of claim 7, comprising a triangular cross-section, a square cross-section, or a circular cross-section.

13. The void fill product of claim 1, wherein each of the at least two layers surrounds the hollow center at the angle in relation to the longitudinal axis of the void fill product.

14. A process for forming the void fill product of claim 1, the process comprising:

wrapping the single spiraled continuous paper sheet around a mold at least twice to form the at least two layers overlapping in the first direction with the hollow center filled by the mold;

cutting an unwrapped portion of the single spiraled continuous paper sheet to separate the unwrapped portion from the at least two layers;

crumpling the at least two layers in the second direction to mechanically interlock the at least two layers without stitching or an adhesive; and removing the at least two layers from the mold.

15. The process of claim 14, wherein the mold comprises a triangular, square, or circular cross-section.

16. The process of claim 14, further comprising unrolling the single spiraled continuous paper sheet from a roll of paper.

17. The process of claim 14, wherein crumpling the at least two layers in the second direction comprises using one or more first sets of rollers to force portions of the at least two layers in the second direction to overlap and interlock while wrapped around the mold.

18. The process of claim 17, further comprising crumpling the at least two layers in a third direction that is opposite of the second direction.

19. The process of claim 18, wherein crumpling the at least two layers in the third direction comprises using one or more second sets of rollers to force portions of the at least two layers in the third direction to overlap and interlock while wrapped around the mold.

* * * * *